United States Patent [19]

Robbins

[11] 4,201,013
[45] May 6, 1980

[54] VINE SUPPORT AND/OR GUIDE CLIP FOR INSTALLATION ON BRICK WALLS

[76] Inventor: Raymond E. Robbins, Rte. 1, Lowell, Ark. 72745

[21] Appl. No.: 904,394

[22] Filed: May 10, 1978

[51] Int. Cl.² .............................................. A01G 9/12
[52] U.S. Cl. ..................................... 47/44; 24/261 R; 47/47; 174/163 R; 248/226.5; 256/57
[58] Field of Search ...................................... 47/44–47; 33/85, 86, 272; 294/62, 33; 24/261 R; 248/226.5; 256/57; 174/163 R

[56] References Cited

U.S. PATENT DOCUMENTS

| | | | |
|---|---|---|---|
| 194,102 | 8/1877 | Muller | 47/46 |
| 326,921 | 9/1885 | Russell | 24/261 R X |
| 384,293 | 6/1888 | Snedden | 24/261 R |
| 642,053 | 1/1900 | Rea | 256/57 |
| 867,379 | 10/1907 | Kaufmann | 24/261 R |
| 884,256 | 4/1908 | Addie | 24/261 R X |
| 997,022 | 7/1911 | Tennant et al. | 24/261 R X |
| 1,025,311 | 5/1912 | Rowell | 47/47 |
| 1,080,836 | 12/1913 | Lake | 33/85 |
| 1,933,218 | 10/1933 | Miller | 47/46 |
| 2,492,044 | 12/1949 | Hulquist | 33/86 |
| 4,031,627 | 6/1977 | Dar | 33/85 |
| 4,145,840 | 3/1979 | Davidson | 47/44 |

FOREIGN PATENT DOCUMENTS

| | | | |
|---|---|---|---|
| 5844 | of 1903 | United Kingdom | 47/44 |
| 380871 | 9/1932 | United Kingdom | 47/47 |

Primary Examiner—Edgar S. Burr
Assistant Examiner—Steven A. Bratlie
Attorney, Agent, or Firm—Silverman, Cass & Singer, Ltd.

[57] ABSTRACT

A wire clip for direct attachment to individual bricks of a masonry wall as a support and/or guide for climbing plants growing along the wall. The clip is a unitary wire member bent to the desired configuration and has a pair of opposite angular bent end formations and an intermediate outwardly projecting return bent formation which defines a loop when installed. The clip is slightly bowed and is spreadable so that the end formations engage opposite parallel longitudinal sides of an individual brick of the masonry wall with the clip disposed across the face thereof and the vine stem passing through the loop. Installation is effected by application of thumb pressure to the loop; disengagement can be effected by applying leverage thereto, all without any residual damage to the wall since installation does not involve digging into the brick or mortar.

7 Claims, 4 Drawing Figures

U.S. Patent
May 6, 1980
4,201,013
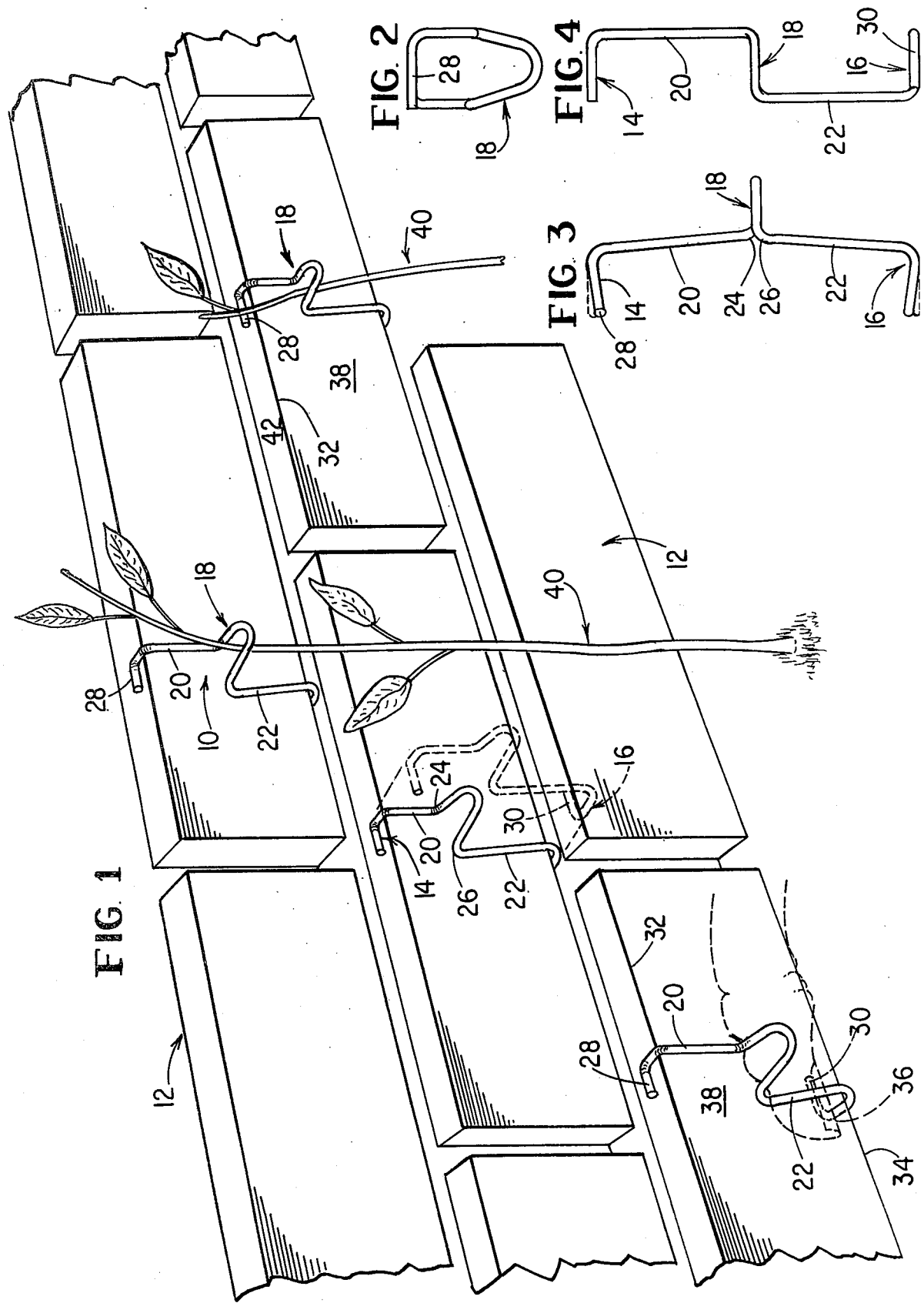

VINE SUPPORT AND/OR GUIDE CLIP FOR INSTALLATION ON BRICK WALLS

BACKGROUND OF THE INVENTION

This invention relates generally to brackets, clips and the like for guiding and/or supporting vine-like plant growth along building walls. In particular, there is provided a wire clip especially for direct attachment to the individual bricks making up a masonry building wall without damage to, or marring of, the bricks or the mortar joints during installation or disengagement from said wall, and further, without requiring separate fastening or holding devices, or special tools.

Wire clips, brackets or the like are known for use in supporting and/or guiding the growth of plants, such as climbing vines, along exterior building walls. Angle screws, eyelets, etc., function for such purposes. Nails, bolts, and like fastening devices also have been required to secure such support devices to the building walls. Masonry walls present problems of installation not encountered with wood, metal and like materials forming said wall. The nature of masonry material such as brick and mortar, required the use of particular fastening devices such as expansion screws and bolts, the installation and removal of which require special tools and result in residual damage to the masonry wall.

Nails, eyelets and similar devices directly applied to a masonry wall find only a slight holding medium in the mortar joint or cause fracture of the brick if secured directly thereto. These devices soon become detached under the weight applied thereto and fall out or at least become loosened. The resultant cavities not only mar the surface, but comprise refuge pockets for insects, etc., which tend to attack the vines being supported.

The expansion-type holding devices conventionally provided for masonry structures require predrilling of passageways therefor, insertion and setting of said devices into said passageways and thereafter, insertion of the vine supporting and/or guiding structures into said holding devices. A prime disadvantage of such expedients is the permanence of the installation. It is often desired that the location of the support and/or guide devices be changed. When conventional devices described above are removed and/or relocated, considerable damage to the masonry is effected. Repair is necessitated, if possible.

Accordingly, it is desirous to provide a support and/or guide for vines and the like during growth thereof which can be directly installed upon a masonry wall and be removable therefrom without damage to the wall. The use of specialized tooling is to be avoided so that the average homeowner easily can install and/or remove said support and/or guide.

SUMMARY OF THE INVENTION

A wire clip for supporting and/or guiding plant growth along a masonry wall comprising, a wire body having opposite angular rearwardly directed end formations and an intermediate forwardly projecting return bent formation, said body being bowed slightly and adapted to be spread to effect engagement thereof across the face of an individual brick of said masonry wall with the end formations engaged on the parallel longitudinal sides of said brick. The plant is accommodated through the loop defined between the face of the brick and the return bent intermediate formation. Installation is effected by placement of the lower end formation along the undersurface of the brick and exerting upwardly directed thumb pressure to the intermediate formation whereby to cam the upper end formation over the upper longitudinal edge of the brick and onto the adjacent surface thereof. Removal is effected by exertion of simple prying or lever action by applying a screwdriver blade to the clip at the upper end thereof, for example.

BRIEF DESCRIPTION OF THE DRAWING

FIG. 1 is a perspective view of a brick wall having plural support and/or guide clips according to the invention installed thereupon for supporting and/or guiding the growth of plants such as vines along said wall;

FIG. 2 is an enlarged top view of the clip according to the invention shown in its condition subsequent to installation;

FIG. 3 is a side elevational view of the lip clip according to the invention illustrated prior to installation and shown in phantom representation in the condition assumed subsequent to installation; and FIG. 4 is a front elevational view of the clip according to the invention illustrated in its condition assumed subsequent to installation.

DESCRIPTION OF A PREFERRED EMBODIMENT

Referring to the drawing, a vine support and/or clip constructed in accordance with the invention is illustrated in FIG. 1 and is designated generally by reference character 10. Clip 10 is one of a plurality of like clips shown installed on individual bricks 12 forming a masonry building wall for supporting and/or guiding the growth of plants such as climbing vines 14, for example, along the wall.

The clip 10 is formed of a unitary length of wire bent to the desired configuration. Each end of clip 10 has a unitary, rearwardly directed right angle bent formations 14 and 16. A return bent, outwardly projecting formation 18 is located intermediate the end formations 14 and 16. Connecting arms 20 and 22 complete the clip; the formations 14, 16 and 18 being disposed in generally horizontal planes while the arms 20 and 22 are oriented generally vertically.

The arms 20 and 22 are unitary with the free ends 24 and 26 of formation 18 and extend in opposite directions, arm 20 extending upward and arm 22 being directed downward.

As illustrated, the arms 20 and 22 are arranged vertically offset though generally parallel one to the other. The free legs 28 and 30 are directed in opposite directions and in generally parallel planes.

Arms 20 and 22 are canted rearwardly relative to the outwardly directed formation 18 so that clip 10 appears to be bowed, the extent or degree of bowing being slight.

The clip 10 is installed easily on the individual brick 12 of the masonry wall obviating the need for expansion type anchors conventionally required to install holders, brackets or the like on masonry building walls.

In order to install clip 10, the lower angular formation 16 is arranged to engage the brick 12 below the lower one 34 of its generally parallel top and bottom edges 32 and 34 respectively. With the angular formation 16 gripping the under surface 36 of the brick, the clip 10 is brought against the face 38 of brick 12 so that arm 20 thereof rests thereon. The formation 18 bridges the stem 40 of the vine to pass therethrough, that is, through the loop defined by said formation 18 and the face 38 of the brick 12.

The arm 22 is brought adjacent the face of brick 12. Thumb pressure is exercised upwardly against formation 18 from below the same. This causes the angular formation 14 to bear against the upper edge 32 of the brick 12 and to be cammed over the said edge 32. The formation 14 engages the top surface 42 of the brick 12 inward of said upper edge 32. The bow of clip 10 is relieved, that is, clip 10 can be described as being spread so that arms 20 and 22 have their longitudinal axes disposed in parallel planes, each being engaged on the face 38 of said brick. Both angular formations 14 and 16 grip their respectively engaged surfaces so that the clip 10 is seated firmly on the brick 12.

The clip 10 may be removed as desired from the masonry wall and/or relocated without leaving any residual pockets, scars, etc. In order to remove the installed clip 10, the blade end of a screwdriver or similar conventional prying tool is inserted between the face 38 of brick 12 and arm 20 adjacent angular formation 14. Using the tool as a lever, one merely lifts the formation 14 over the edge 32 or applies leverage to the upper portion of arm 20.

The clip can be installed on narrower bricks by increasing the extent of the bow thereof and/or by bending the angular end formations relative arms 20 and 22 to reduce the distance therebetween.

Although the clip has been described in respect of its primary function to support and guide plant growth such as climbing vines and the like on an exterior masonry wall, the clip is as useful as installed on interior walls. Also, the return bent formation may be utilized as a hanger support for potted plants and/or other such purposes. Also, the clip, according to the invention, may be used to support a plumb line during construction of a masonry wall. The clip 10, according to the invention, is versatile as to application and relatively inexpensive to construct and use.

In lieu of exertion of thumb pressure as described above, simple tools may be utilized for installation on, as well as disengagement from, the masonry wall.

The type of wire as well as the material of which the wire clip is formed is not critical. Of course, too soft wire which is easily mallable is not desirous. Wire of such diameter as to render the clip non-resilient may not have the full advantage of the invention herein disclosed. Note since the clip is installable without digging into the mortar or the brick surface, no damage, marring, residual holes or cavities, etc. is effected on the masonry wall, either against the brick or mortar surface.

I claim:

1. A support and/or guide clip for climbing vines, especially for masonry building walls consisting of individual generally rectangular masonry units and comprising a unitary, resilient wire clip having an intermediate generally horizontally outwardly projecting return bent formation having spaced ends, a pair of oppositely directed, generally vertically oriented offset arm portions at the spaced ends of said return bent formation, said arm portions having terminal ends and a pair of angular formations at the terminal ends of said arm portions extending in a plane generally normal thereto but in a direction opposite that of said return bent formation, said angular formations each comprising a first leg at the terminal ends and a second leg, the second legs of said angular formations extending in relative opposite directions and having free ends terminating in a location offset one from the other taken along a vertical plane, each angular formation occupying a horizontal plane generally normal to its respective arm portion, said arm portions being arranged along first and second intersecting planes, the intersection of which defines an obtuse angle whereby the clip is bowed inward yet is spreadable for installation engaged across the face of the masonry unit with the angular formations engaged on the lengthwise generally parallel side surfaces of the masonry unit with the arm portions generally parallel and the return bent formation defining with the face of the masonry unit, a loop to receive the stem of a climbing vine therethrough.

2. The clip as claimed in claim 1 wherein the second legs are substantially equal in length.

3. The clip as claimed in claim 1 wherein the degree of bow is selected to enable upward thumb pressure on the return bent formation to drive said angular formations into engaging condition with the masonry unit.

4. The clip as claimed in claim 1 wherein the second legs of the angular formations each are oriented generally normal relative the first respective first right angular configuration.

5. The clip as claimed in claim 1 where the return bent formation is U-shaped.

6. The clip as claimed in claim 1 in which the second legs of the angular formations are coplanar with the respective first legs thereof.

7. The clip as claimed in claim 6 in which said angular formations lie in generally parallel planes when installed on the masonry unit.

* * * * *